(12) United States Patent
Lee et al.

(10) Patent No.: US 11,222,039 B2
(45) Date of Patent: Jan. 11, 2022

(54) METHODS AND SYSTEMS FOR VISUAL DATA MANIPULATION

(71) Applicant: Workday, Inc., Pleasanton, CA (US)

(72) Inventors: Darren Lee, Sunnyvale, CA (US); Huned Botee, San Francisco, CA (US); Ilan Cohen, Santa Clara, CA (US); Mythili Gopalakrishnan, San Francisco, CA (US); Peter Long, Maroochydore (AU); Tim Berston, Leeming (AU); Adam Smith, Brisbane (AU)

(73) Assignee: Workday, Inc., Pleasanton, CA (US)

(*) Notice: Subject to any disclaimer, the term of this patent is extended or adjusted under 35 U.S.C. 154(b) by 305 days.

(21) Appl. No.: 15/487,159

(22) Filed: Apr. 13, 2017

(65) Prior Publication Data

US 2017/0300545 A1  Oct. 19, 2017

Related U.S. Application Data

(60) Provisional application No. 62/322,758, filed on Apr. 14, 2016.

(51) Int. Cl.
| | |
|---|---|
| *G06F 3/0484* | (2013.01) |
| *G06F 9/44* | (2018.01) |
| *G06Q 10/06* | (2012.01) |
| *G06T 11/20* | (2006.01) |
| *G06F 16/26* | (2019.01) |
| *G06F 8/34* | (2018.01) |
| *G06F 8/38* | (2018.01) |

(52) U.S. Cl.
CPC ............ *G06F 16/26* (2019.01); *G06F 3/0484* (2013.01); *G06F 8/34* (2013.01); *G06F 8/38* (2013.01); *G06Q 10/06* (2013.01); *G06T 11/206* (2013.01)

(58) Field of Classification Search
CPC .......... G06F 16/26; G06F 8/38; G06F 3/0484; G06F 8/34; G06Q 10/06; G06T 11/206
See application file for complete search history.

(56) References Cited

U.S. PATENT DOCUMENTS

| | | | |
|---|---|---|---|
| 10,521,077 B1 * | 12/2019 | Beran | G06F 3/04842 |
| 2010/0058250 A1 * | 3/2010 | Stannard | G06F 17/24 715/856 |
| 2015/0067568 A1 * | 3/2015 | Lee | G06F 3/04842 715/771 |

* cited by examiner

*Primary Examiner* — Jennifer N Welch
*Assistant Examiner* — Parmanand D Patel
(74) *Attorney, Agent, or Firm* — Van Pelt, Yi & James LLP

(57) ABSTRACT

A system for visual modification of data. The system comprising, an interface layer for displaying data and for receiving one or more visual inputs for modifying data; a data layer for storing data; and an analysis engine layer for connecting the interface layer and the data layer, wherein the analysis engine layer is configured to receive the one or more visual inputs from the graphical interface for modifying the graphical representation; modify the underlying data based on the visual inputs; modify a derived data based on the modified underlying data; and transfer the modified derived data to the interface layer for display.

15 Claims, 11 Drawing Sheets

METHODS AND SYSTEMS FOR VISUAL DATA MANIPULATION

RELATED APPLICATION(S)

This non-provisional application claims the benefit of priority to U.S. provisional patent application No. 62/322,758, filed on Apr. 14, 2016, the entire contents of which is incorporated herein by reference.

TECHNICAL FIELD

The present disclosure relates generally to enterprise software applications used for analyzing data, and particularly for visualizing and visually modifying data.

BACKGROUND

Data analytic applications may process large volumes of detailed data to help users such as managers answer questions about past business performance. For example, a national retail store may populate a database with transaction records for every item it actually sells. A store finance manager might want to understand the actual sales results for a certain product category, say shoes, in a particular geographic region, say California, for the prior fiscal quarter. In order to answer this question, an analytic application may select the subset of sales records for the products that belong to the shoe category (e.g., sandals, sneakers, dress shoes, etc.) that happened in California during periods between the start and end date of the prior fiscal quarter; aggregate the sales metric along the dimensions Product, Geography, and Time; and present the results in a format suitable for analysis using a grid interface, such as a pivot table, or a graphical interface, such as those available by traditional business intelligence software applications.

Moreover, a user may need to use the application to analyze the effect of modifying some inputs in the outcomes. For example, a store finance manager may want to analyze historic performance as a way to plan for future outcomes. This may help her answer questions such as how much of product X should be sold in region Z next year to achieve a revenue goal without stressing the product inventory. Or analyze what impact will a 10% raw material cost increase have on profitability next quarter.

To answer such questions, an analytic application may provide a model that derives outcomes based on input assumptions. Assumptions are values of variables that determine the outcome. Models are relationships among the assumptions and the outcomes. For example, a model could calculate Sales Dollars as Units Sold*Unit Price. The number of Units Sold or the Unit Price are assumptions that may be input by the user or derived as a projection of historic results. For data entry, analytic applications may use a forms-based interface popular with database applications.

For many kinds of analysis tasks, analyzing historic results as a way to inform future decisions is a single integrated process. Existing computer applications, however, force analysts to accomplish their work using disparate tools and usability paradigms. They only allow adjustment of assumptions, e.g., units sold, through cumbersome direct interactions with database tools. Therefore, what is needed are computer based systems and methods that combine data analytics, modeling, and data entry as a way to facilitate visualization of historic data and to plan future outcomes. Such computer based systems and methods should present a visual, multidimensional representation of large amounts of detailed data, allow the specification of calculation models to derive future outcomes based on historic data and user-input assumptions, and allow for the adjustment of assumptions using a visual paradigm, right from the context of visual data analysis exploration.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1:
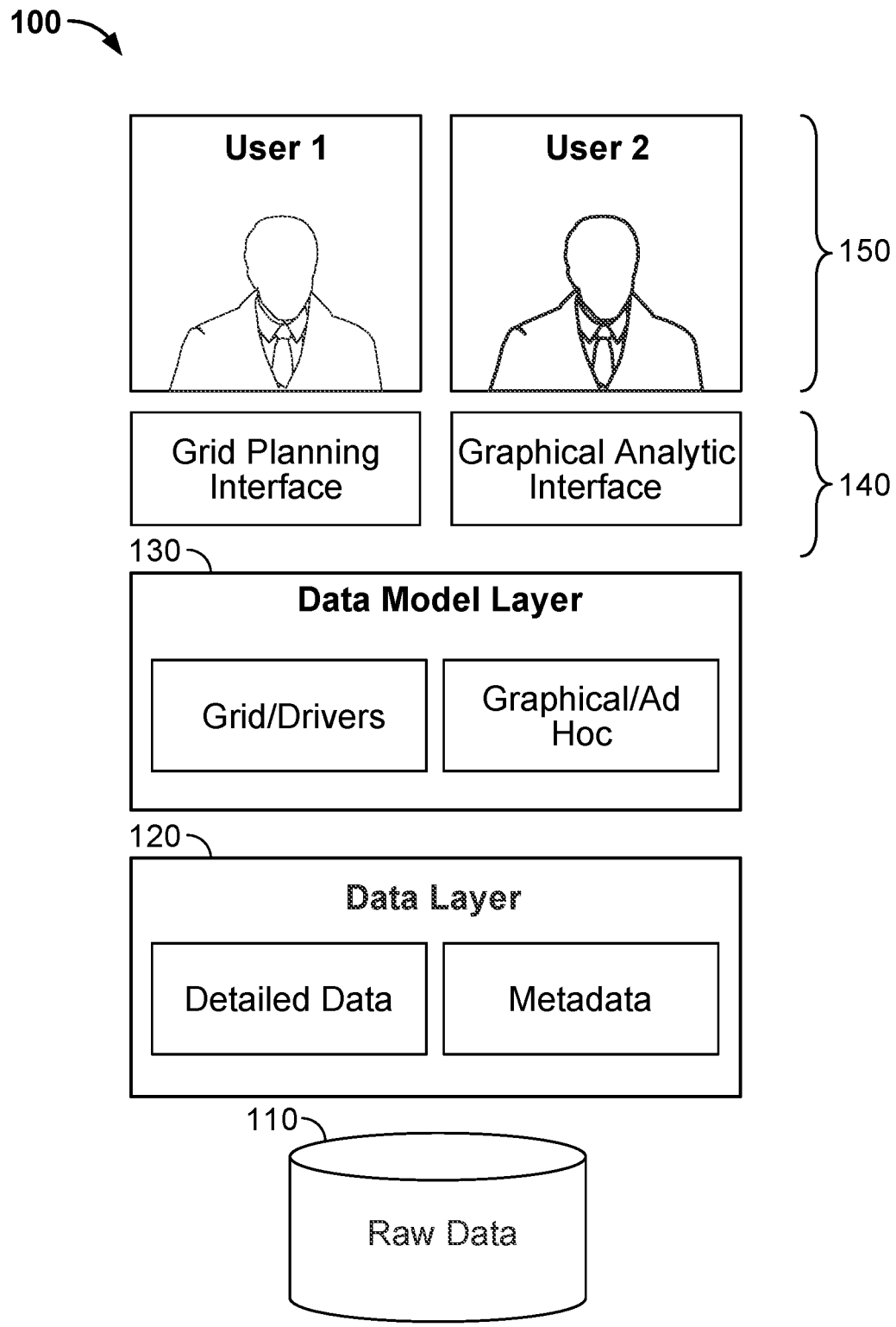
FIG. 1 depicts an exemplary architecture of a system for implementing the visualization and modification of data according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

In various embodiments, the metrics modeled in analytic applications are interlinked. For example, Revenue and Units Sold are inputs, while Average Selling Price is derived as Revenue/Units Sold. The model may also derive Revenue Growth Rate by comparing Revenue between two time periods. Planners may use driver-based models to forecast future outcomes. For example, they may manipulate Revenue Growth Rate to derive how many units would need to be sold, and therefore manufactured, in order to meet the Revenue goal.

To analyze trends and the impacts of driver changes, planners may rely on visualizations. For manipulating key figures, however, traditional driver-based modeling systems relegate users to grid interfaces akin to spreadsheet models. Using such systems can be cumbersome and unintuitive, especially when the models get large and complex.

The methods and systems disclosed in various embodiments provide for visual driver adjustment by allowing planners to interact directly with visual representations of data. A planner may, for example, select a data point on a chart of data and drag it up or down, depending on the requirements of the analysis scenario. The system may then update the underlying data and other data that depend on the modified data. The system may further redraw visual display of data, e.g., graphs or grids, based on updated data.

Some embodiments take advantage of some of the existing user interface capabilities provided by various devices, such as computers that include, for example, a mouse or a touchpad, a display, one or more processors, memory, etc. These capabilities include manipulating visual data, such as the adjustment of multiple data points through multiple select. Moreover, various embodiments can be executed on one or more computing devices using various components and peripherals such as processors or output devices, and displaying data and visuals on computer displays.

FIG. 1 depicts an exemplary architecture of a system 100 for implementing the visualization and modification of data according to some embodiments. System 100 includes raw data 110, data layer 120, data model layer 130, visual layer 140, and users 150.

Raw data 110 may include the base data, such as transactional data maintained in an enterprise database. Data Layer 120 may include Detailed Data and Metadata associated with elements of raw data. These data at data layer 120 may be represented in a database.

Data model layer 130 sits on top of data layer 120 and may associate the underlying Detailed Data and/or Metadata with Grids and Drivers that may provide analytical information about the data, such as values from detailed data aggregated along dimensions for OLAP style analysis. Similarly, the underlying Detailed Data and/or Metadata may be represented at the Data Model Layer by a Graphical or Ad Hoc analysis. At a higher level, the system may present the analyses at data model layer 130 to users as a Grid Planning Interface (which would typically be used by a planner, such as user 1, tasked with preparing and presenting a plan), or as an Analytical Interface (which would typically be used by a decision maker, such as user 2, to review, iterate, and approve a plan).

Visual layer 140 may utilize one or more displays for visualizing data and for receiving input for modifying data. Visual layer 140 may include a grid planning interface and a graphical analytic interface for respectively creating a grid interface and a graphical interface as further discussed below.

Figure 2:
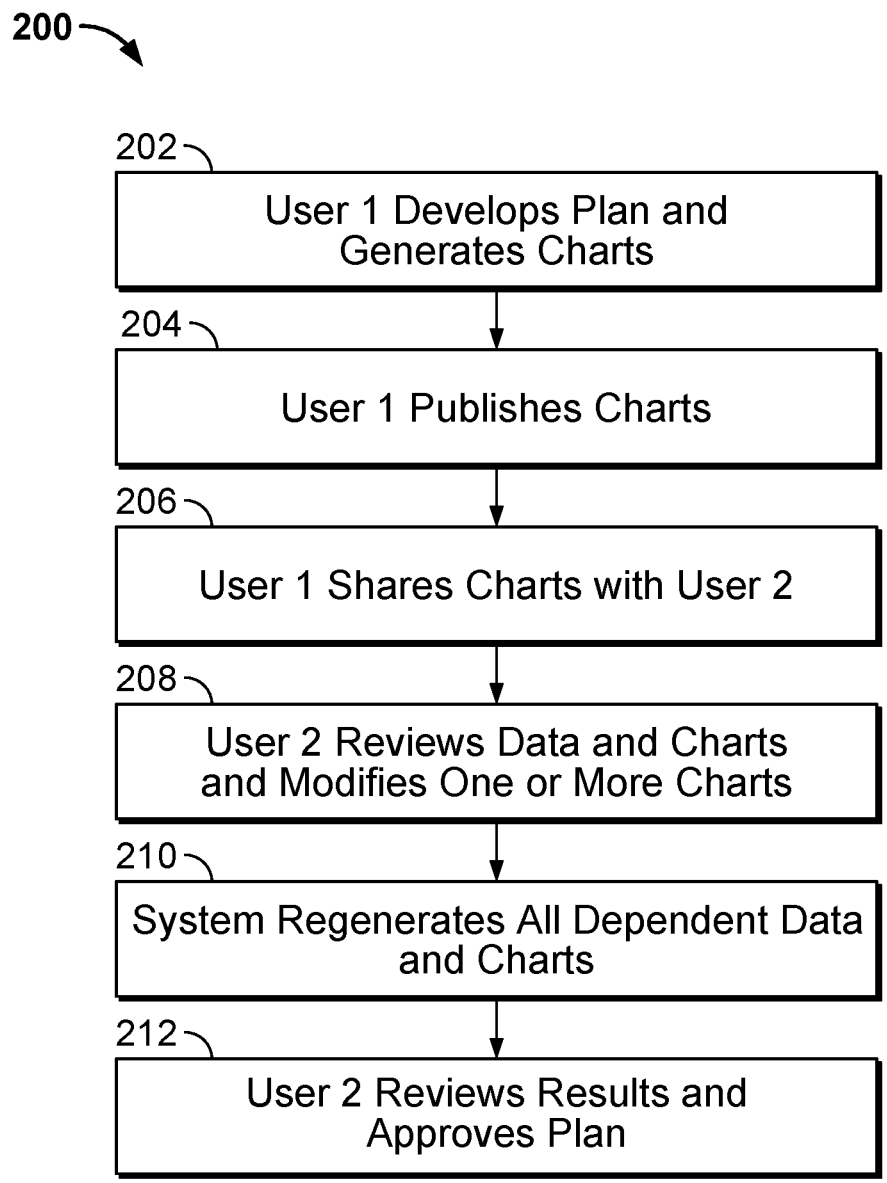
FIG. 2 shows a flowchart for interaction among users utilizing the system of FIG. 1 or other systems disclosed herein according to some embodiments.

Some embodiments facilitate the interactive, and possibly real-time, collaboration between such users, enabling faster and more accurate iteration to reach a final plan. FIG. 2 shows a flowchart 200 for interaction among users utilizing system 100 of FIG. 1 or other systems disclosed herein according to some embodiments.

In step 202, user 1 develops a detailed plan and System analysis using the grid interface. User 1 may then select some of the results and generate charts for them. For example, user 1 may generate charts for projected sales volumes and revenues for optimistic and pessimistic plan versions. The plan may include models and values for assumptions.

In step 204, user 1 publishes those charts to a user interface that supports visual dashboards. The user interface may be a software application that is geared toward data analysis in support of data planning.

In step 206, user 1 shares the above charts with user 2. As a result, user 2 may receive an alert, e.g., an email, a text message, etc. The alert may include the newly generated charts, or a link to them, and a message, asking user 2 to review.

In step 208, user 2 reviews one or more of the charts. User 2 may, for example, would like to understand the impact of a change in one or more of assumed data (e.g., an increase of 10% in the number of units sold in every month for the next three months, and/or an increase in unit price in the third month) on all other data (e.g., revenue, inventory, raw materials needed, etc.). User 2 may modify the corresponding charts (e.g., the chart for the monthly units sold and/or the chart for the unit price the third month) accordingly.

In step 210, the system regenerates all charts and data (e.g., for total revenue, etc.) based on the modified chart(s).

In step 212, user 2 reviews the modified data and/or charts and accordingly approves the plan based on the original or modified assumptions.

Figure 3:
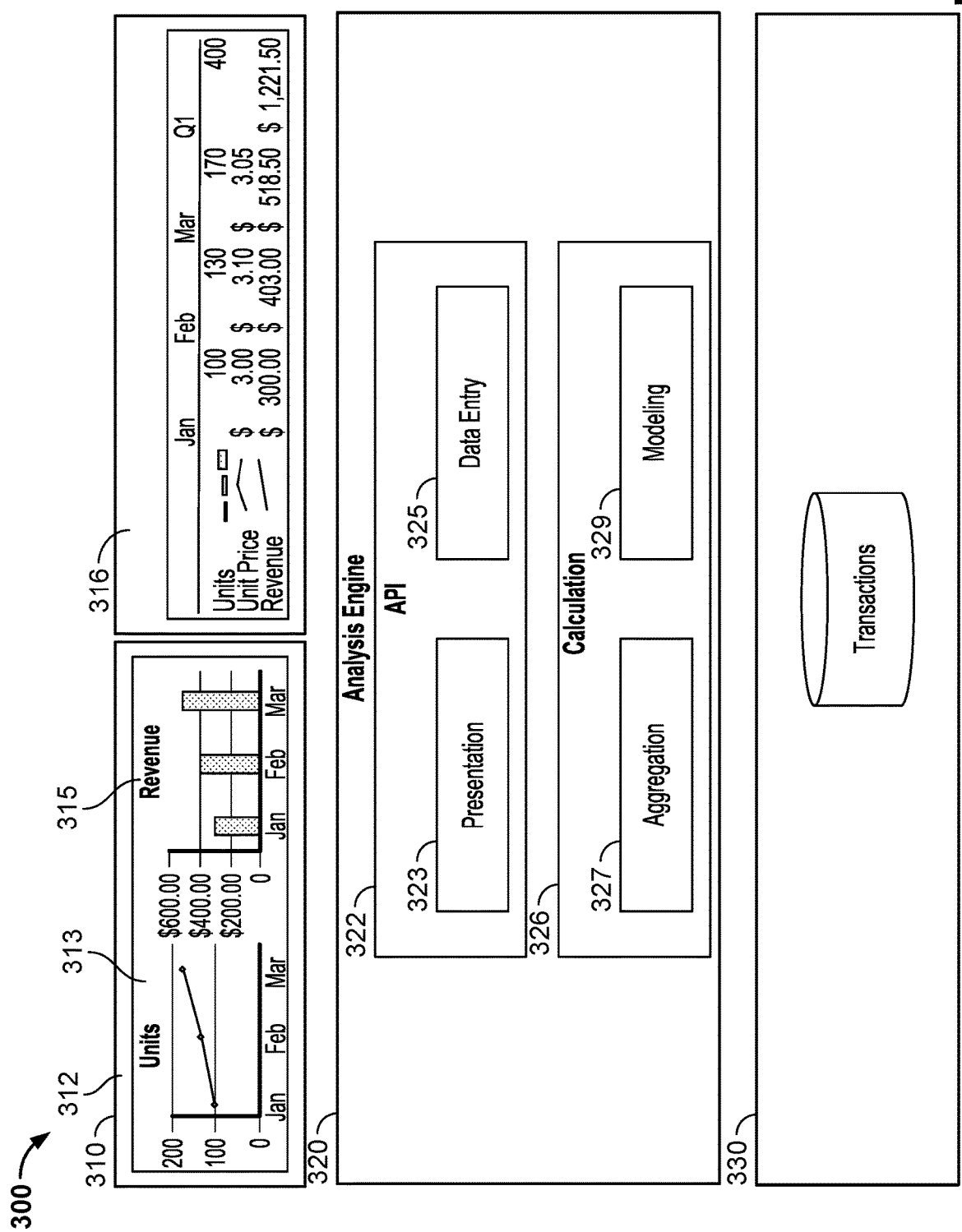
FIG. 3 shows a structure of a system for visual display and modification of data according to some embodiments.

FIG. 3 shows a structure of another system 300 for visual display and modification of data according to some embodiments. System 300 includes an interface layer 310, an analysis engine layer 320, and a data layer 330. Interface layer 310 provides an interface for visual display of data and receiving input for modifying data. Data layer 330 stores data that are displayed or modified. Analysis engine layer 320 connects interface layer 310 and data layer 330.

Interface layer 310 may be a web base application that is accessible to a user through, for example, a browser or a spreadsheet application. Interface layer 310 may include a graphical interface 312 and a grid interface 316. Graphical interface 312 may include one or more graphical elements such as a graph chart interface 313 and a bar chart interface 315.

Analysis engine layer 320 may include an Application Program Interface (API) sub-layer 322 and a calculation sub-layer 326. API sub-layer may include a presentation module 323 and a data entry module 325. Calculation sub-layer 326, on the other hand, may include an aggregation module 327 and a modeling module 329.

Figure 4:
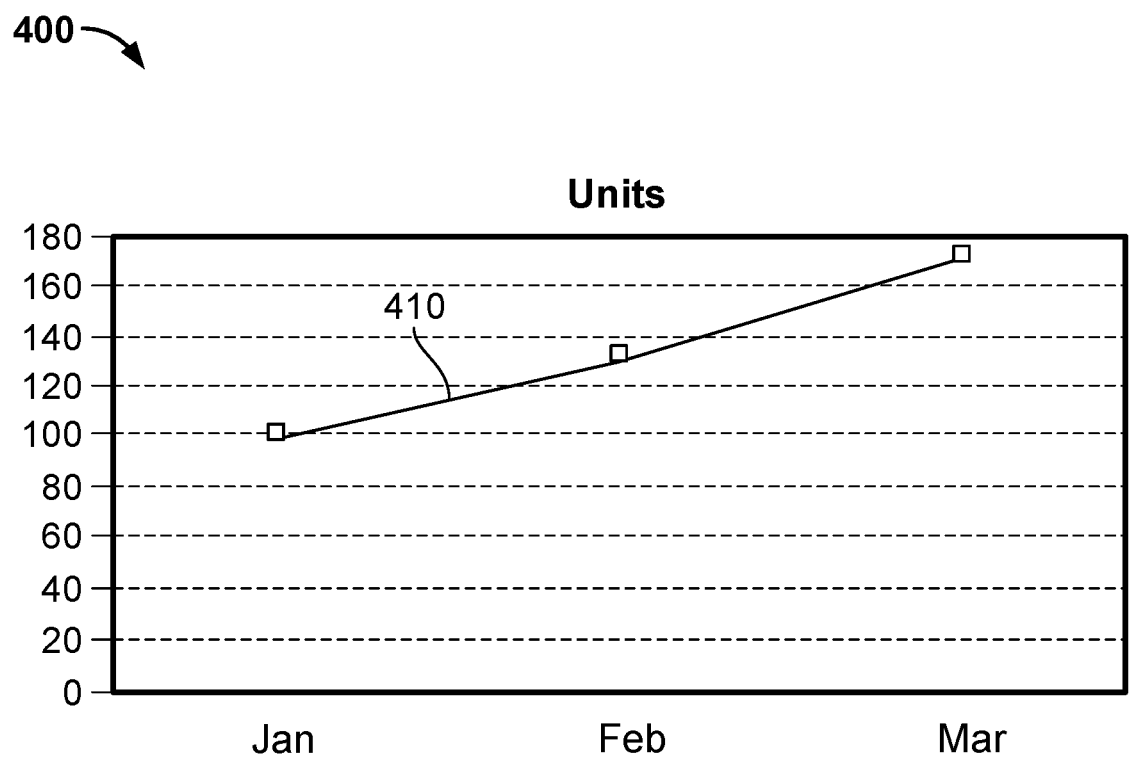
FIG. 4 shows a graph chart interface according to some embodiments.

FIG. 4 shows a graph chart interface 400 according to some embodiments. A graph chart interface may display data and may also receive input for modifying the data. Graph chart interface 400 includes a graph 410 that shows the number of units for product sold in the months of January, February, and March of an exemplary year according to one embodiment. In particular, graph 410 shows that 100 units were sold in January, 130 units were sold in February, and 170 units were sold in March.

Graph chart interface 400 may receive input for modifying graph 410. A user may, for example, modify graph 410 by dragging and moving one or more of its points. The system may detect such modifications and accordingly modify the underlying data as further described below. Some embodiments may include other types of graphical elements, such as bar chart interfaces, to display data and to modify data.

Figure 5:
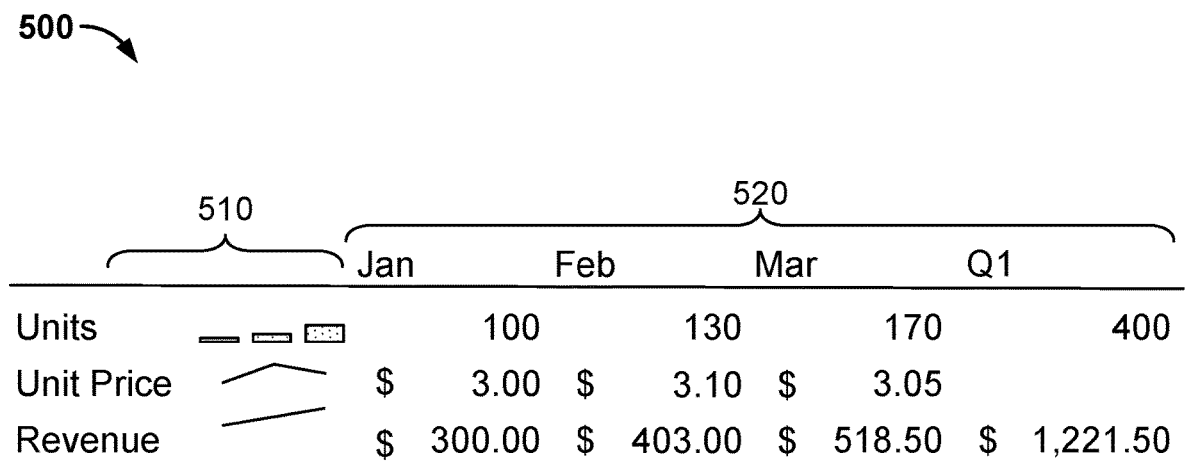
FIG. 5 shows a grid interface according to some embodiments.

FIG. 5 shows a grid interface 500 according to some embodiments. A grid interface may be in the form of a table that visualizes or lists a set of data. In particular, grid interface 500 visualizes and lists data for number of units, unit price, and total revenue, for the months of January, February, and March, and the total, if applicable, for the first quarter. Grid interface 500 is in the form of a table with three rows and five columns. The three rows are respectively labeled Units, Unit Price, and Revenue. The first column, sparkline section 510, includes sparklines, which are miniature visualizations of the data, as further explained below. The second to fifth columns compose numerical data section 520. These columns arerespectively labeled Jan, Feb, Mar, and Q1.

In the first row, columns 2-4 of the numerical data section 520 indicate that the number of units sold in January, February, and March were, respectively, 100, 130, and 170. Column 5 of the numerical data section 520, on the other hand, indicates that the total number of units sold in the first quarter were 400. Sparkline section 510 for the first row shows a miniature bar chart depicting relative size of these data for January-March.

In the second row, columns 2-4 of the numerical data section 520 indicate that the price of each unit in January, February, and March were, respectively, $3.00, $3.10, and $3.05. Column 5 of the numerical data section 520, on the other hand, is blank, as it is not applicable. Sparkline section 510 for the second row shows a miniature graph chart depicting relative changes of the unit price for January-March.

In the third row, columns 2-4 of the numerical data section 520 indicate that the revenue from the sale of the product in January, February, and March were, respectively, $300.00, $403.00, and $518.50. These data are derived, using the model by multiplying the number of units by the unit price for each month. Column 5 of the numerical data section 520, on the other hand, indicates that the corresponding total revenue for the first quarter was $1221.50. This value is derived by adding the revenues of the 3 months of January, February, and March, in the previous columns. Sparkline section 510 for the third row shows a miniature graph chart depicting relative changes of the revenue for January-March.

Figure 6:
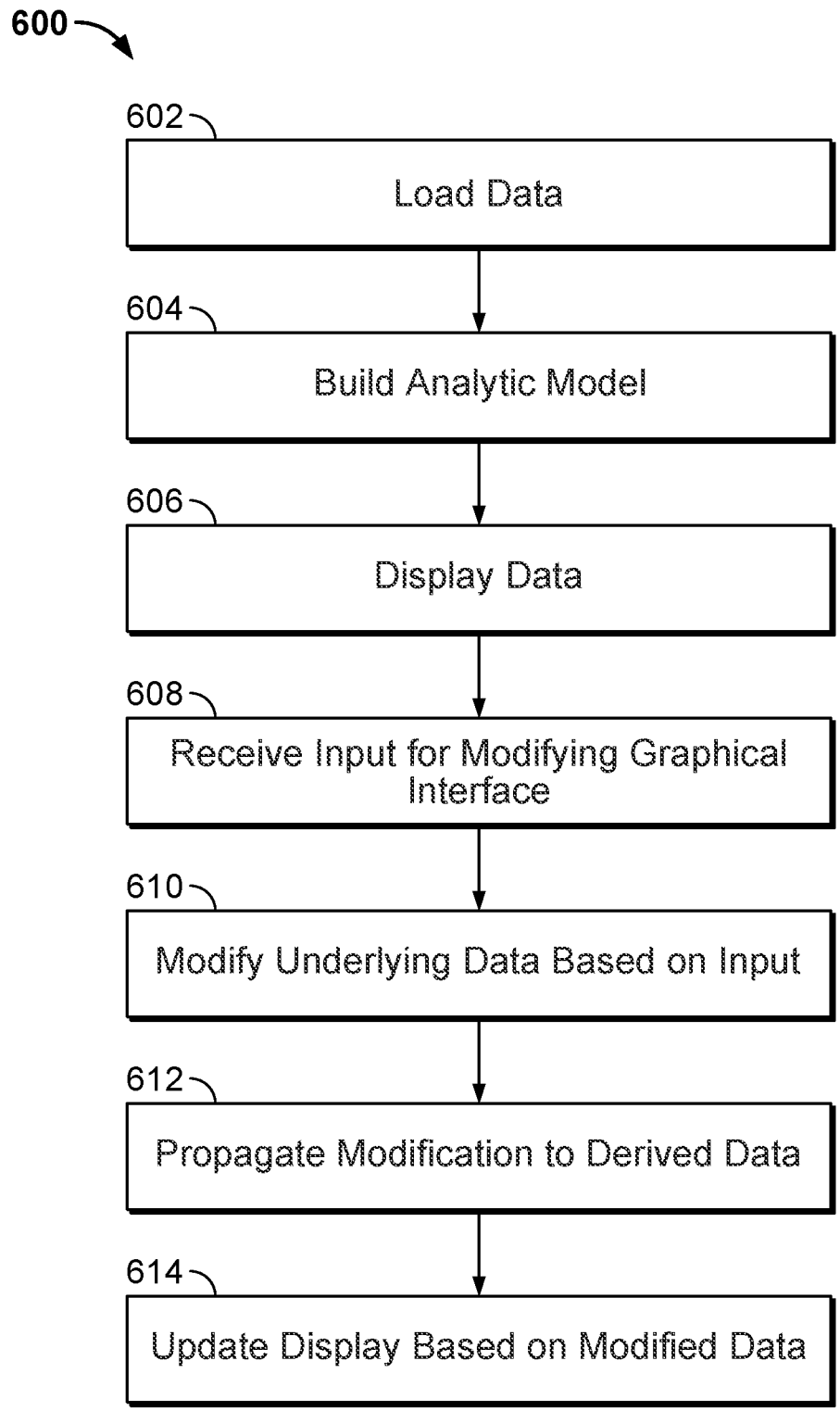
FIG. 6 shows a flowchart for visual modification of data according to some embodiments.

FIG. 6 shows a flowchart 600 for visual modification of data according to some embodiments. In various embodiments, flowchart 600 may be executed by a system such as system 300 of FIG. 3. In some embodiments, an analysis engine, such as analysis engine 320, perform one or more of the steps.

In step 602, the data is loaded. In one embodiment, for example, the data may include data related to transactions, sales, unit prices, revenues, etc. The system may load the data from a data storage such as data layer 330.

In step 604, the system builds an analytic model for combining and displaying the data. The analytic model may assist the system to analyze and modify the data. In some embodiments, the analytic model may be a traditional OLAP system or an in-memory calculation engine. In some embodiments, drivers are introduced to model future outcomes. For example, units driver affects inventory balance and revenue. The analytic model may, for example, include a relationship that the revenue is calculated based on the product of the units sold and the unit price.

In step 606, the system displays the data. The system may display the data in a graph chart interface 400. Examples of such displays are shown in FIGS. 4 and 5.

In step 608, the system receives an input indicating a modification of the displayed data as inputs into the display. In some embodiments, a user may modify the displayed data by interacting with one or more graphical elements in a graphical interface, such as graphical interface 400.

Figure 7:
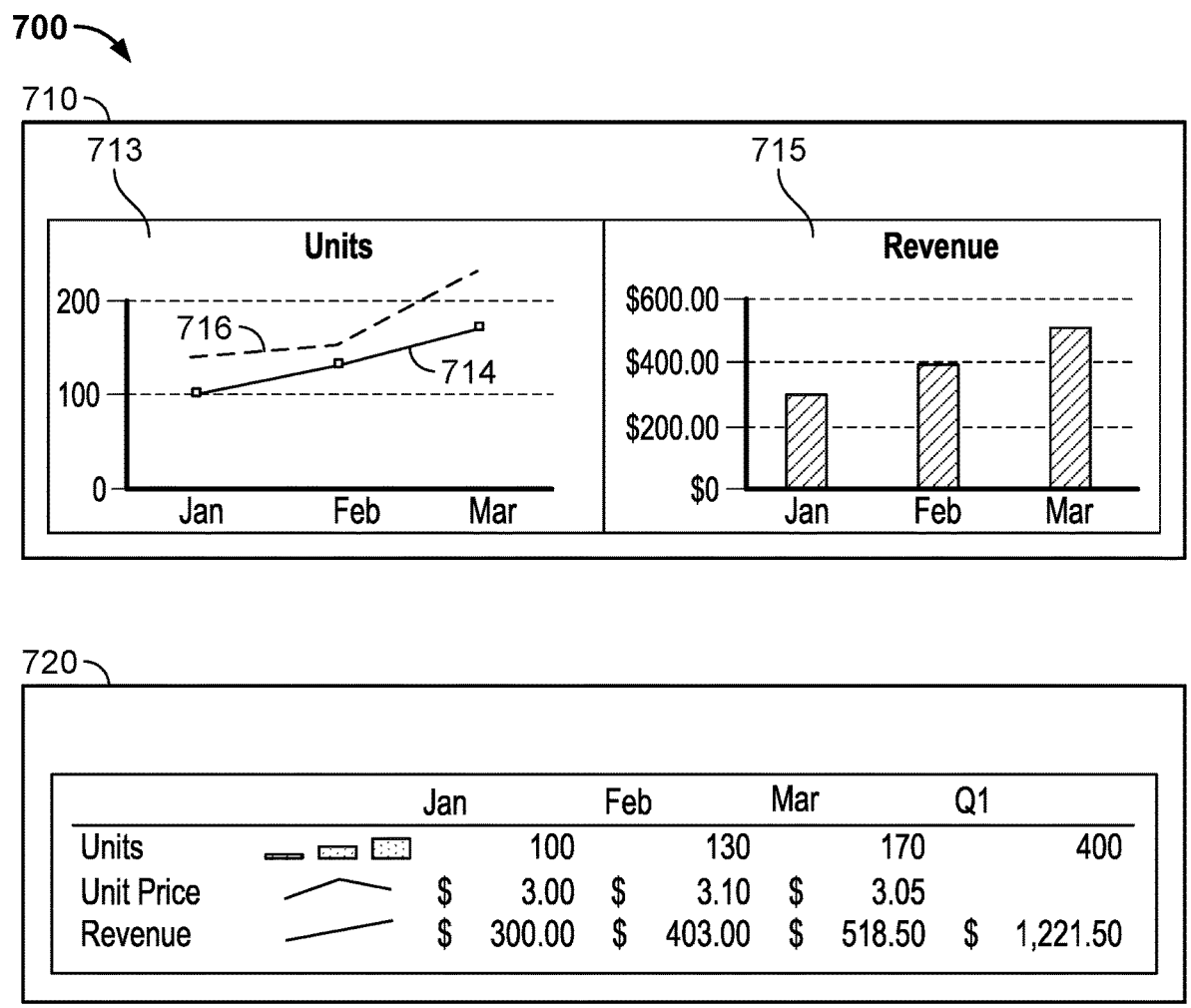
FIG. 7 shows an interface layer that depicts receiving display modification input according to some embodiments.

FIG. 7 shows an interface layer 700 that depicts receiving display modification input according to some embodiments. Interface layer 700 includes a graphical interface 710 and a grid interface 720. Graphical interface 710 includes a graph chart interface 713 and a bar chart interface 715. The interfaces display data that are similar to those discussed in relation to FIGS. 3-5, in addition to a modified graph 716, discussed below.

Graphical interface 710 includes a graph chart interface 713. Graph chart interface 713 includes an original graph 714 and a modified graph 716 for the number of units of the product sold in a three-month period, as discussed in relation to FIG. 4. Original graph 714 is similar to graph 410 in FIG. 4. The system may generate modified graph 716 from original graph 714 after receiving an input from, for example, a user. The user may, for example, drag one or more points of original graph 714 to create modified graph 716. The user may modify the graph to see how would the results, such as revenue, change if the number of sold units changes. In this case, modified graph 716 indicates an increase in the number of sold units in each of the three months.

Returning to FIG. 6, in step 610, the system receives the modification of the graph and accordingly modifies the underlying data in the database. In the example of FIG. 7, discussed above, the system receives the modification of original graph 714 into modified graph 716, and accordingly modifies the underlying data, which are the number of sold units in three-month period. To that end, the system may perform the steps shown in FIG. 8.

Figure 8:
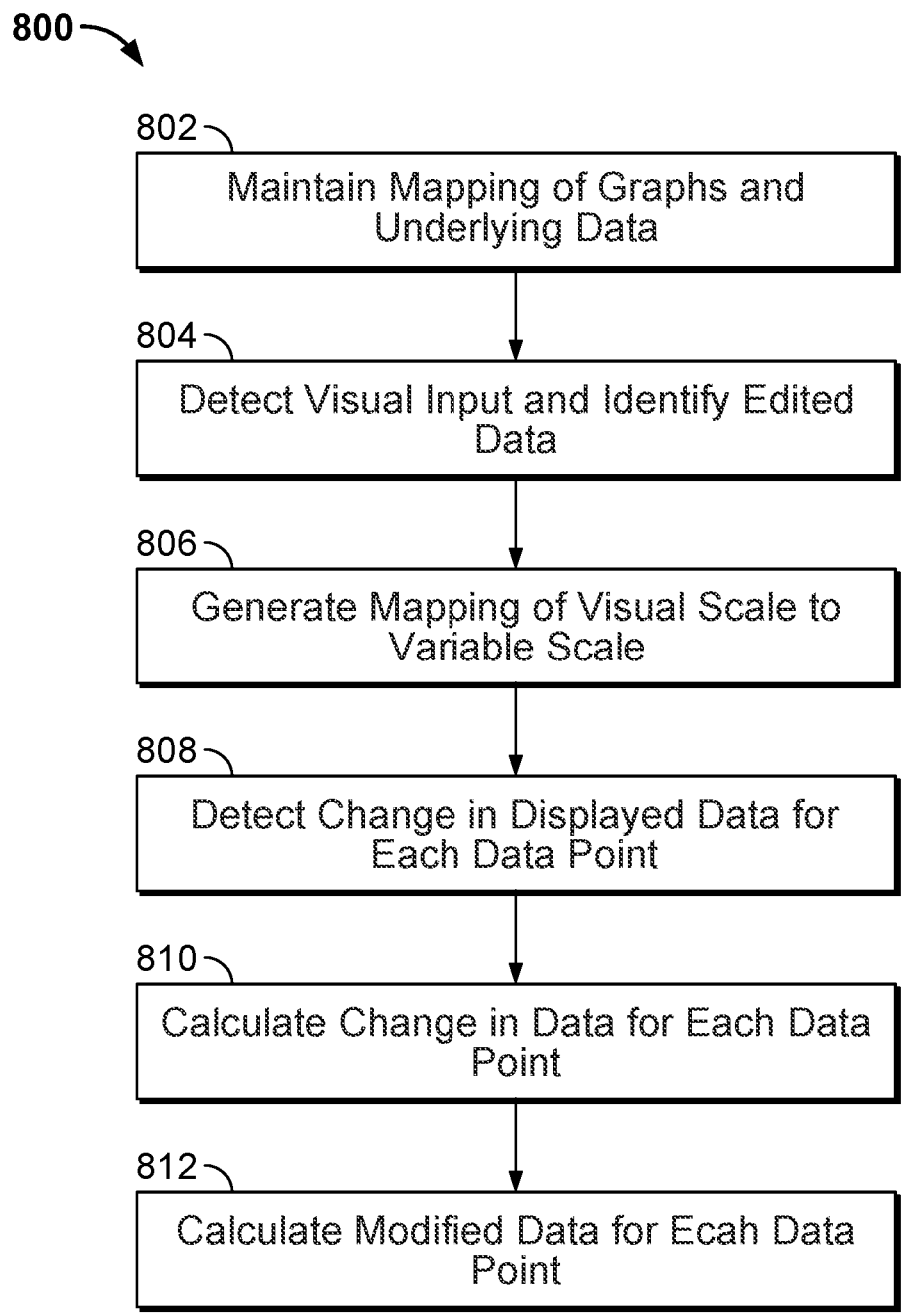
FIG. 8 shows a flowchart for modifying underlying data based on visual modification input according to some embodiments.

FIG. 8 shows a flowchart 800 for modifying underlying data based on visual modification input according to some embodiments. In various embodiments, flowchart 800 or parts of it may be executed by a system such as system 300 of FIG. 3, or parts of such a system, such as analysis engine 320.

In step 802, the system maintains a first mapping of graphs with the underlying data. Such a first mapping maps, for example, original graph 714 with the underlying data for the number of products sold in the three months graphed there.

In some embodiments, step 802 includes an initialization step. In the initialization step, the system may create and maintain a table that maps an editable metric (e.g., representing the unit cost assumption) to the chart that visually represents that metric, the chart type (i.e., line, bar, pie, etc.), chart scaling, and chart units (i.e., dollars, units, percents, etc.).

The system administrator or application developer may tag the visual data representations as editable. Alternatively, the system may detect which visualizations are editable. It may do so as illustrated in the following example.

In an example, a data set includes the following data elements and model: 1) historic unit prices over time, 2) historic sales units over time, 3) future unit price assumption, 4) revenue calculation that derives revenue as unit cost times units sold.

The system administrator or application developer selects these data elements for rendering using line charts. The presentation module interrogates the modeling module to discover which of the data elements are editable and tags them as such. It then presents visual cues on the rendered chart to alert the end user that the chart is editable.

In addition to maintaining a catalog of the editable metric-chart mappings, the system may track and provide explicit support for specific chart types. For example, an editable metric rendered as a line chart may consist of points that can be moved up and down, while a pie chart may consist of slices whose area can be adjusted radially.

If the chart representing an editable metric is a line chart, for example, the user interface layer may accommodate line chart point adjustment along the vertical axis and collecting information about the relative size of the adjustment linearly. If, on the other hand, the chart representing an editable metric is a pie chart, for example, the interface layer may accommodate pie chart radial adjustment and collecting information about the angle of the adjustment. In this case, the data entry module may calculate the delta to the original angle to derive the size of the new slice.

Returning to FIG. 8, in step 804 the system detects a visual modification of data and identifies, based on the first mapping, the underlying data to be modified. In the case of FIG. 7, for example, the system detects a visual input that modifies original graph 714 to modified graph 716. Moreover, the system uses the first mapping and determines that the visual modification relates to modifying the underlying data for number of products sold in January, February, and Mach.

In step 806, the system generates a second mapping between the visual scale in the modified graph along an axis, e.g., the ordinate, and the numerical scale of the data corresponding to that axis. The system may do so by selecting a numerical range of data along the axis and finding the corresponding visual range (e.g., in pixels) and dividing the second number by the first. In the case of graph chart 713 of FIG. 7, for example, the system generates a second mapping between a number of pixels along the ordinate of graph chart 713 and the numerical scale of the data for the number of products sold. The system may determine that, for example, every 2 pixels in the vertical direction correspond to 1 sold unit.

In step 808, the system detects the amount of the visual change in the modified graph for each data point. In the case of FIG. 7, for example, the system may detect that modified graph 716 has shifted up compared to original graph 714 as follows: for the data point in January by 70 pixels, for the data point in February by 22 pixels, and for the data point in March by 100 pixels.

In step 810, the system calculates the changes in the underlying data based on the shifts detected in step 808 and the second mapping generated in step 806. In the case of FIG. 7, for example, the system uses the second mapping of 2 pixels to one 1 unit and calculates that in the modified data the number of sold units should be increased by 35 in January, by 11 in February, and by 50 in March.

In step 812, the system determines the modified data by using the original data and the changes to those data as calculated in step 810. For example, in the case of FIG. 7, the system uses the increases calculated above and the original numbers of sold units, such as those shown in the first row of grid interface 720, and calculates that the modified numbers of sold units in January, February, and March should respectively be 135, 141, and 220.

Returning to flowchart 600, in step 612 the system propagates the modifications to all derived data that are affected by those modifications. The system may do so by using the relationship among different data as stored in the analytic model. In the case of FIG. 7, for example, the system propagates the modifications of the number of sold units to derived data such as revenues.

In step 614, the system updates the displayed data to display the modified data. The system may display both the original data and the modified data to allow the user to observe the effect of the modifications.

Figure 9:
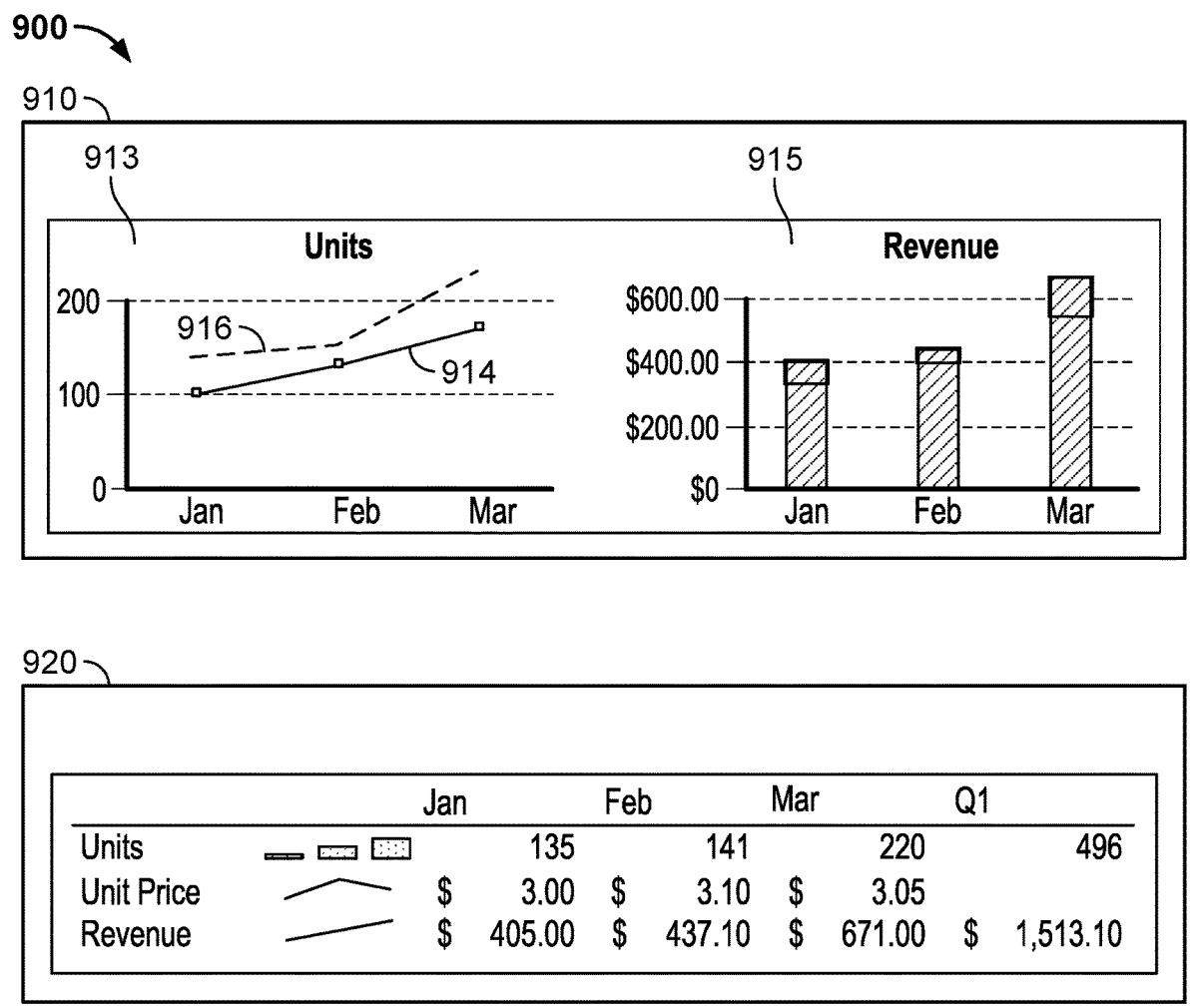
FIG. 9 shows an interface layer that depicts displaying modified data and graphs according to some embodiments.

FIG. 9 shows an interface layer 900 that depicts displaying modified data and graphs according to some embodiments. Interface layer 900 includes a graphical interface 910 and a grid interface 920. Graphical interface 910 includes a graph chart interface 913 and a bar chart interface 915. Graph chart interface 913 includes an original graph 914 and a modified graph 916, which are similar to graphs 714 and 716 of FIG. 7.

In grid interface 920, the first row includes modified data for sold units as discussed above. These data are different from the data in the first row of grid interface 720, which are the original unit prices.

In grid interface 920, the second row includes the unit price data, which have not changed and are similar to those of grid interface 720 of FIG. 7.

In grid interface 920, the third row includes the modified revenue data, which are derived based on the modified number of sold units in the first row and the unit prices in the second row. These data are different from the data in the third row of grid interface 720, which are the original revenues derived from the original number of sold units.

Bar chart interface 915 displays the modified revenues in a bar chart. The three bars in bar chart interface 915 show the modified revenues for the three months of January, February, and March. Each bar includes two parts, a lower bar that corresponds to the original revenue as listed in grid interface 720, and an upper part that corresponds to the increase in revenue resulting from the increase in the number of sold units.

Interface layers 700 and 900 therefore enable a user to modify one or more of the data and observe the effect of those modifications in all data numerically or visually.

Figure 10:
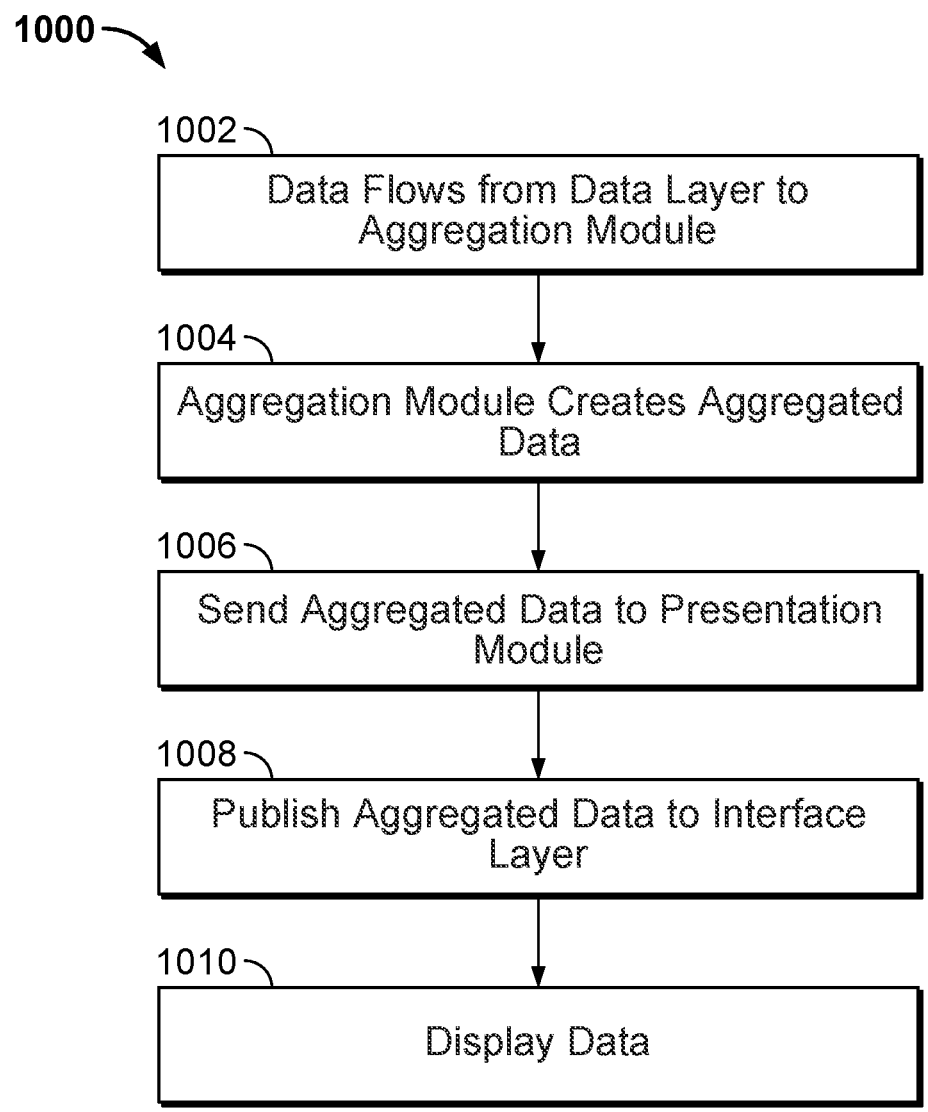
FIG. 10 shows a flowchart for visualizing data for analysis according to some embodiments.

FIG. 10 shows a flowchart 1000 for visualizing data for analysis according to some embodiments. In various embodiments, flowchart 1000 or parts of it may be executed by a system such as system 300 of FIG. 3.

In step 1002, data flow from data layer 330 to aggregation module 327. The data may be collected, e.g., from a user or a customer, by a data collection module such as an order processing system that captures customer orders or a point of sale system that captures sale transactions.

In step 1004, aggregation module 327 creates aggregated data such as data summaries along with dimensions. A point of sale system at a retail store, for example, might capture sales transactions categorized by the time of the sales, the product sold, the sales person, and the store. To facilitate analysis, the aggregation module may summarize the sales transactions along Time, Product, Sales_Person, and Store dimensions.

In step 1006, aggregation module sends aggregated data to presentation module 323.

In step 1008, presentation module 323 publishes aggregated data to one or more parts of interface layer 310.

In step 1010, interface layer 310 displays the data in one or more ways described above.

Figure 11:
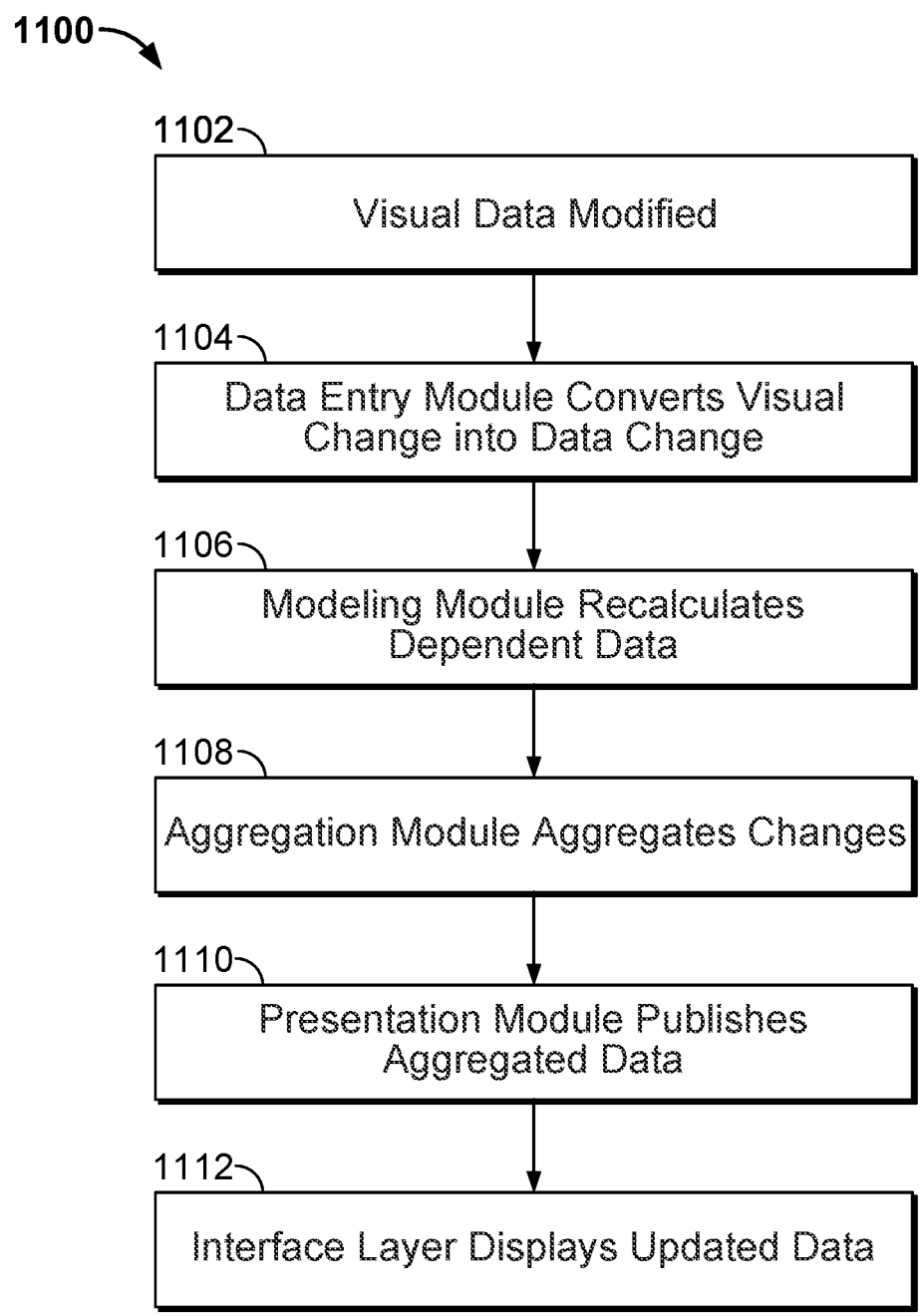
FIG. 11 shows a flowchart for modifying visualized data.

A user may modify visualized data on the display to change some of the assumed data and observe the effect of the change on the results. FIG. 11 shows a flowchart 1100 for modifying visualized data. In various embodiments, flowchart 1100 or parts of it may be executed by a system such as system 300 of FIG. 3.

In step 1102, a user such as an analyst modifies the visualized data on the display. If the display utilizes an editable line chart, the user may, for example, change the unit price by dragging up or down points on a line chart that shows unit prices for each month. This change in the assumed unit price can change the total revenue, as the model may include the relationship that the total revenue is the product of unit price and total units sold.

In step 1104, data entry module 325 receives this modification of the visual and converts it into a change in the underlying data, e.g., the unit price. It does so by looking up the assumption modified in the editable chart in the metric mapping table, and converting the relative magnitude of the adjustment into a delta to the assumption value. This may be done by capturing and then scaling the number of pixels that represent the distance that the user dragged a given data point on the line chart.

In step 1106, modeling module 329 receives the change in the underlying data and recalculates all data that, in the model, depend on the changed data. In the above example, for instance, the modeling module receives the change of unit price for one or more months and recalculates the total revenue for every month in which the unit price has changed.

In step 1108, aggregation module 327 receives the changed data and aggregates those changes to create updated aggregated data.

In step 1110, presentation module 323 receives and publishes the updated aggregated data to one or more parts of interface layer 310.

In step 1112, interface layer 310 displays the updated data in one or more ways described above.

Each of the systems described above may comprise multiple modules. The modules may be implemented individually or their functions may be combined with the functions of other modules. Further, each of the modules may be implemented on individual components, or the modules may be implemented as a combination of components. For example, each of the modules may be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of the corresponding module. In some embodiments, one or more of the disclosed methods are stored in the form of programs on one or more non-transitory computer readable mediums. A computer readable medium can be a data storage module. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature exists in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method for visual modification of data, the method comprising:

simultaneously displaying a graphical interface and a grid interface, wherein the graphical interface comprises a graphical representation of an underlying data, wherein the graphical representation of the underlying data includes a first chart comprising one or more editable metrics and a second chart comprising one or more values derived from the one or more editable metrics, and wherein the grid interface comprises a tabular representation of the underlying data, wherein the graphical representation of the underlying data includes an original bar, wherein the graphical representation of the underlying data includes a modified bar, wherein the modified bar comprises a first part corresponding to the original bar and a second part corresponding to a difference between the modified bar and the original bar;

receiving one or more visual inputs to the graphical interface for modifying the graphical representation of the underlying data, wherein the one or more received visual inputs modifies at least one of the one or more editable metrics;

in response to the one or more received visual inputs, modifying the underlying data, wherein modifying the underlying data comprises:

changing a corresponding value associated with the at least one of the one or more editable metrics from an original metric value to a modified metric value; and updating a value of the one or more values derived from the one or more editable metrics from an original derived value to a modified derived value, wherein the original derived value is based at least in part on the original metric value, and wherein the modified derived value is based at least in part on the modified metric value;

displaying, in the graphical interface, an updated first chart and an updated second chart, wherein the updated second chart comprises the original derived value, the modified derived value, and a difference between the modified derived value and the original derived value; and displaying in the grid interface an updated tabular representation comprising at least one of the modified metric value and the modified derived value.

2. A system for visual modification of data, comprising:
a graphical interface configured to:
   simultaneously display a graphical interface and a grid interface, wherein the graphical interface comprises a graphical representation of an underlying data, wherein the graphical representation of the underlying data includes a first chart comprising one or more editable metrics and a second chart comprising one or more values derived from the one or more editable metrics, and wherein the grid interface comprises a tabular representation of the underlying data, wherein the graphical representation of the underlying data includes an original bar, wherein the graphical representation of the underlying data includes a modified bar, wherein the modified bar comprises a first part corresponding to the original bar and a second part corresponding to a difference between the modified bar and the original bar;
   receive one or more visual inputs for modifying the graphical representation of the underlying data, wherein the one or more received visual inputs are configured to modify at least one of the one or more editable metrics;
and
a processor configured to:
   in response to the one or more received visual inputs, modify the underlying data, wherein to modify the underlying data, the processor is configured to:
      change a corresponding value associated with the at least one of the one or more at least one of the editable metrics from an original metric value to a modified metric value; and
      update a value of the one or more values derived from the one or more editable metrics from an original derived value to a modified derived value, wherein the original derived value is based at least in part on the original metric value, and wherein the modified derived value is based at least in part on the modified metric value;
   display, in the graphical interface, an updated first chart and an updated second chart, wherein the updated second chart comprises the original derived value, the modified derived value, and a difference between the modified derived value and the original derived value; and
   display in the grid interface an updated tabular representation comprising at least one of the modified metric value and the modified derived value.

3. A non-transitory computer readable medium storing computer instructions that, when executed by a computer, performs a method for visual modification of data, the method comprising:
   simultaneously displaying a graphical interface and a grid interface, wherein the graphical interface comprises a graphical representation of an underlying data, wherein the graphical representation of the underlying data includes a first chart comprising one or more editable metrics and a second chart comprising one or more values derived from the one or more editable metrics, and wherein the grid interface comprises a tabular representation of the underlying data, wherein the graphical representation of the underlying data includes an original bar, wherein the graphical representation of the underlying data includes a modified bar, wherein the modified bar comprises a first part corresponding to the original bar and a second part corresponding to a difference between the modified bar and the original bar;
   receiving one or more visual inputs to the graphical interface for modifying the graphical representation of the underlying data, wherein the one or more received visual inputs modifies at least one of the one or more editable metrics;
   in response to the one or more received visual inputs, modifying the underlying data, wherein modifying the underlying data comprises:
      changing a corresponding value associated with the at least one of the one or more editable metrics from an original metric value to a modified metric value; and
      updating a value of the one or more values derived from the one or more editable metrics from an original derived value to a modified derived value, wherein the original derived value is based at least in part on the original metric value, and wherein the modified derived value is based at least in part on the modified metric value;
   displaying, in the graphical interface, an updated first chart and an updated second chart, wherein the updated second chart comprises the original derived value, the modified derived value, and a difference between the modified derived value and the original derived value; and
   displaying in the grid interface an updated tabular representation comprising at least one of the modified metric value and the modified derived value.

4. The method of claim 1, wherein a graph chart interface displays one or more of the first chart and the second chart.

5. The method of claim 1, wherein a bar chart interface displays the original bar or the modified bar.

6. The system of claim 2, wherein a graph chart interface displays one or more of the first chart and the second chart.

7. The method of claim 2, wherein the graphical representation of the underlying data includes an original bar.

8. The method of claim 7, wherein the graphical representation of the underlying data includes a modified bar, wherein the modified bar comprises a first part corresponding to the original bar and a second part corresponding to a difference between the modified bar and the original bar.

9. The method of claim 8, wherein a bar chart interface displays the original bar or the modified bar.

10. The non-transitory computer readable medium storing computer instructions of claim 3, wherein a graph chart interface displays one or more of the first chart and the second chart.

11. The non-transitory computer readable medium storing computer instructions of claim 3, wherein the graphical representation of the underlying data includes an original bar.

12. The non-transitory computer readable medium storing computer instructions of claim 11, wherein the graphical representation of the underlying data includes a modified bar, wherein the modified bar comprises a first part corresponding to the original bar and a second part corresponding to a difference between the modified bar and the original bar.

13. The non-transitory computer readable medium storing computer instructions of claim 12, wherein a bar chart interface displays the original bar or the modified bar.

14. The method of claim 1, wherein the updated first chart comprises the original metric value and the modified metric value.

15. The method of claim 1, wherein the graphical interface comprises a visual indication that the first chart is editable.

* * * * *